(12) United States Patent
Ko et al.

(10) Patent No.: US 11,494,959 B2
(45) Date of Patent: Nov. 8, 2022

(54) METHOD AND APPARATUS WITH GENERATION OF TRANSFORMED IMAGE

(71) Applicant: SAMSUNG ELECTRONICS CO., LTD., Suwon-si (KR)

(72) Inventors: Minsu Ko, Suwon-si (KR); Sungjoo Suh, Seongnam-si (KR); Young Chun Ahn, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/344,114

(22) Filed: Jun. 10, 2021

(65) Prior Publication Data

US 2022/0148244 A1  May 12, 2022

(30) Foreign Application Priority Data

Nov. 12, 2020  (KR) .................. 10-2020-0150747
Dec. 23, 2020  (KR) .................. 10-2020-0181653

(51) Int. Cl.
*G06T 11/60*  (2006.01)
*G06T 5/50*  (2006.01)
*G06N 3/04*  (2006.01)

(52) U.S. Cl.
CPC ............ *G06T 11/60* (2013.01); *G06N 3/0472* (2013.01); *G06T 5/50* (2013.01);
(Continued)

(58) Field of Classification Search
None
See application file for complete search history.

(56) References Cited

U.S. PATENT DOCUMENTS

2021/0209464 A1\*  7/2021  Bala .................... G06T 11/60
2022/0004821 A1\*  1/2022  Yu ...................... G06V 40/172
(Continued)

FOREIGN PATENT DOCUMENTS

KR  10-2020-0048032 A  5/2020
KR  10-2022-0086049 A  6/2022
WO  WO 2018/085729 A1  5/2018

OTHER PUBLICATIONS

Abdal, Rameen, et al., "Image2StyleGAN: How to Embed Images Into the Stylegan Latent Space?," *Proceedings of the IEEE/CVF International Conference on Computer Vision*, 2019, (pp. 4432-4441).
(Continued)

*Primary Examiner* — Yanna Wu
(74) *Attorney, Agent, or Firm* — NSIP Law

(57) ABSTRACT

A method with generation of a transformed image includes: receiving an input image; extracting, from the input image, coefficients corresponding to semantic elements of the input image; selecting at least one first target coefficient, among the coefficients, corresponding to at least one target semantic element that is to be changed among the semantic elements of the input image; changing the at least one first target coefficient; and generating a transformed image from the input image by applying the coefficients, including the changed at least one first target coefficient, to basis vectors used to represent the semantic elements of the input image in an embedding space of a neural network, the basis vectors corresponding to the semantic elements of the input image.

26 Claims, 10 Drawing Sheets

(52) U.S. Cl.
CPC ............... *G06T 2207/20081* (2013.01); *G06T 2207/20084* (2013.01); *G06T 2207/20221* (2013.01)

(56) References Cited

U.S. PATENT DOCUMENTS

2022/0028139 A1* 1/2022 Mitra ................... G06V 40/169
2022/0188559 A1 6/2022 Baek et al.

OTHER PUBLICATIONS

Voynov, Andrey et al., "Unsupervised Discovery of Interpretable Directions in the GAN Latent Space," *Proceedings of the 37th International Conference on Machine Learning*, PMLR 119, 2020, (11 pages in English).
Chrysos, Grigorios G., et al., "Unsupervised Controllable Generation with Self-Training," arXiv:2007.09250v1, Jul. 2020, (pp. 1-12).
Shen, Yujun et al. "Closed-Form Factorization of Latent Semantics In GANs," arXiv:2007.06600v2, Jul. 2020, (pp. 1-11).
Manjunath, Shashank, et al. "Improving the Performance of Fine-Grain Image Classifiers via Generative Data Augmentation," Aug. 2020, (pp. 1-9).
"Latex Author Guidelines for CVPR Proceedings," *CVPR 2020 Submission*, 2020, (pp. 1-4).
"Learning Orthogonal Space of GAN with Latent Autoencode," *CVPR 2020 Submission #11223*, 2020, (pp. 1-10).

* cited by examiner

Training with real images

Training with fake images

METHOD AND APPARATUS WITH GENERATION OF TRANSFORMED IMAGE

CROSS-REFERENCE TO RELATED APPLICATIONS

This application claims the benefit under 35 USC § 119(a) of Korean Patent Application No. 10-2020-0150747 filed on Nov. 12, 2020, and Korean Patent Application No. 10-2020-0181653 filed on Dec. 23, 2020, in the Korean Intellectual Property Office, the entire disclosures of which are incorporated herein by reference for all purposes.

BACKGROUND

1. Field

The following description relates to a method and apparatus with generation of a transformed image.

2. Description of Related Art

With the development of neural networks, various methods are being developed to generate an image representing an object, such as a human face or nature, that has relatively irregular and various structural variations and that is similar to a real object, such that it is difficult to distinguish between the real object and the object represented by the image. A generative adversarial network (GAN) model may generate a high-quality image, and embedding of visual content may be useful to address various tasks of computer vision.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a method with generation of a transformed image includes: receiving an input image; extracting, from the input image, coefficients corresponding to semantic elements of the input image; selecting at least one first target coefficient, among the coefficients, corresponding to at least one target semantic element that is to be changed among the semantic elements of the input image; changing the at least one first target coefficient; and generating a transformed image from the input image by applying the coefficients, including the changed at least one first target coefficient, to basis vectors used to represent the semantic elements of the input image in an embedding space of a neural network, the basis vectors corresponding to the semantic elements of the input image.

The neural network may include: the basis vectors; an encoder configured to estimate coefficients of the basis vectors to map the input image to the embedding space through the basis vectors; and a generator configured to generate the transformed image by reflecting the coefficients corresponding to the semantic elements of the input image to the basis vectors.

An input space of the generator, and an output space to which a vector mapped using the encoder is projected from the input image based on the basis vectors may be shared as the embedding space.

The selecting of the at least one first target coefficient may include selecting the at least one first target coefficient using a matching table between the semantic elements and the coefficients.

The changing of the at least one first target coefficient may include: determining either one or both of a direction of a change in the at least one first target coefficient and a degree of the change in the at least one first target coefficient; and changing the at least one first target coefficient based on either one or both of the direction of the change and the degree of the change.

The semantic elements may include any one or any combination of any two or more of: first elements including a gender, an age, a race, a pose, a facial expression, and a size of an object included in the input image; second elements including a color, a shape, a style, a pose, a size, and a position of each component of the object; and third elements including glasses, a hat, accessories, and clothes added to the object.

The method may further include: receiving a second input image for changing the at least one first target coefficient; and selecting, from the second input image, at least one second target coefficient corresponding to at least one target semantic element among semantic elements of the second input image. The changing of the at least one first target coefficient may include determining the at least one first target coefficient based on the at least one second target coefficient.

The determining of the at least one first target coefficient based on the at least one second target coefficient may include either one or both of: determining the at least one first target coefficient by combining the at least one first target coefficient and the at least one second target coefficient; and determining the at least one first target coefficient by swapping the at least one first target coefficient with the at least one second target coefficient.

The determining of the at least one first target coefficient based on the at least one second target coefficient may include: determining either one or both of a direction of a change in the at least one first target coefficient and a degree of the change in the at least one first target coefficient; adjusting a first weight of the at least one first target coefficient and a second weight of the at least one second target coefficient based on either one or both of the direction of the change and the degree of the change; and determining the at least one first target coefficient by combining the at least one first target coefficient reflecting the adjusted first weight and the at least one second target coefficient reflecting the adjusted second weight.

In another general aspect, a non-transitory computer-readable storage medium stores instructions that, when executed by a processor, cause the processor to perform the method described above.

In another general aspect, an apparatus with generation of a transformed image includes a communication interface configured to receive an input image; and a processor configured to: extract, from the input image, coefficients corresponding to semantic elements of the input image; select at least one first target coefficient, among the coefficients, corresponding to at least one target semantic element that is to be changed among the semantic elements of the input image; change the at least one first target coefficient; and generate a transformed image from the input image by applying the coefficients, including the changed at least one first target coefficient, to basis vectors used to represent the semantic elements of the input image in an embedding space of a neural network, the basis vectors corresponding to the semantic elements of the input image.

The neural network may include: the basis vectors; an encoder configured to estimate coefficients of the basis vectors to map the input image to the embedding space through the basis vectors; and a generator configured to generate the transformed image by reflecting the coefficients corresponding to the semantic elements of the input image to the basis vectors.

An input space of the generator, and an output space to which a vector mapped using the encoder is projected from the input image based on the basis vectors may be shared as the embedding space.

The processor may be further configured to select the at least one first target coefficient using a matching table between the semantic elements and the coefficients.

The processor may be further configured to: determine either one or both of a direction of a change in the at least one first target coefficient and a degree of the change in the at least one first target coefficient; and change the at least one first target coefficient based on either one or both of the direction of the change and the degree of the change.

The semantic elements may include any one or any combination of any two or more of: first elements including a gender, an age, a race, a pose, a facial expression, and a size of an object included in the input image; second elements including a color, a shape, a style, a pose, a size, and a position of each component of the object; and third elements including glasses, a hat, accessories, and clothes added to the object.

The communication interface may be further configured to receive a second input image for changing the at least one first target coefficient. The processor may be further configured to: select, from the second input image, at least one second target coefficient corresponding to at least one target semantic element among semantic elements of the second input image; and determine the at least one first target coefficient based on the at least one second target coefficient.

The processor may be further configured to determine the at least one first target coefficient by combining the at least one first target coefficient and the at least one second target coefficient, or by swapping the at least one first target coefficient with the at least one second target coefficient.

The processor may be further configured to: determine either one or both of a direction of a change in the at least one first target coefficient and a degree of the change in the at least one first target coefficient; adjust a first weight of the at least one first target coefficient and a second weight of the at least one second target coefficient based on either one or both of the direction of the change and the degree of the change; and determine the at least one first target coefficient by combining the at least one first target coefficient reflecting the adjusted first weight and the at least one second target coefficient reflecting the adjusted second weight.

The apparatus may further include a display configured to display the transformed image.

The input image may be an enrollment image for user authentication. The apparatus may be configured to perform the user authentication by comparing an authentication image of a user to the transformed image.

In another general aspect, an apparatus with image transformation includes at least one processor configured to implement a neural network. The neural network includes: an embedding space; basis vectors representing semantic elements of an input image inputted to the apparatus; an encoder configured to estimate coefficients of the basis vectors to map the input image to the embedding space through the basis vectors; and a generator. The generator is configured to generate a transformed image by: changing at least one first target coefficient, among the coefficients, corresponding to at least one target semantic element that is to be changed among the semantic elements of the input image; and applying the coefficients, including the changed at least one first target coefficient, to the basis vectors.

The embedding space may be configured as an input space of the generator and an output space of the encoder.

The semantic elements may include facial and hair appearance attributes of a person.

The generator may be further configured to select, from a second input image, at least one second target coefficient corresponding to at least one target semantic element among semantic elements of the second input image, and determine the at least one first target semantic element by performing either one of: combining the at least one first target coefficient and the at least one second target coefficient; and swapping the at least one first target coefficient with the at least one second target coefficient.

Other features and aspects will be apparent from the following detailed description, the drawings, and the claims.

Figure 1:
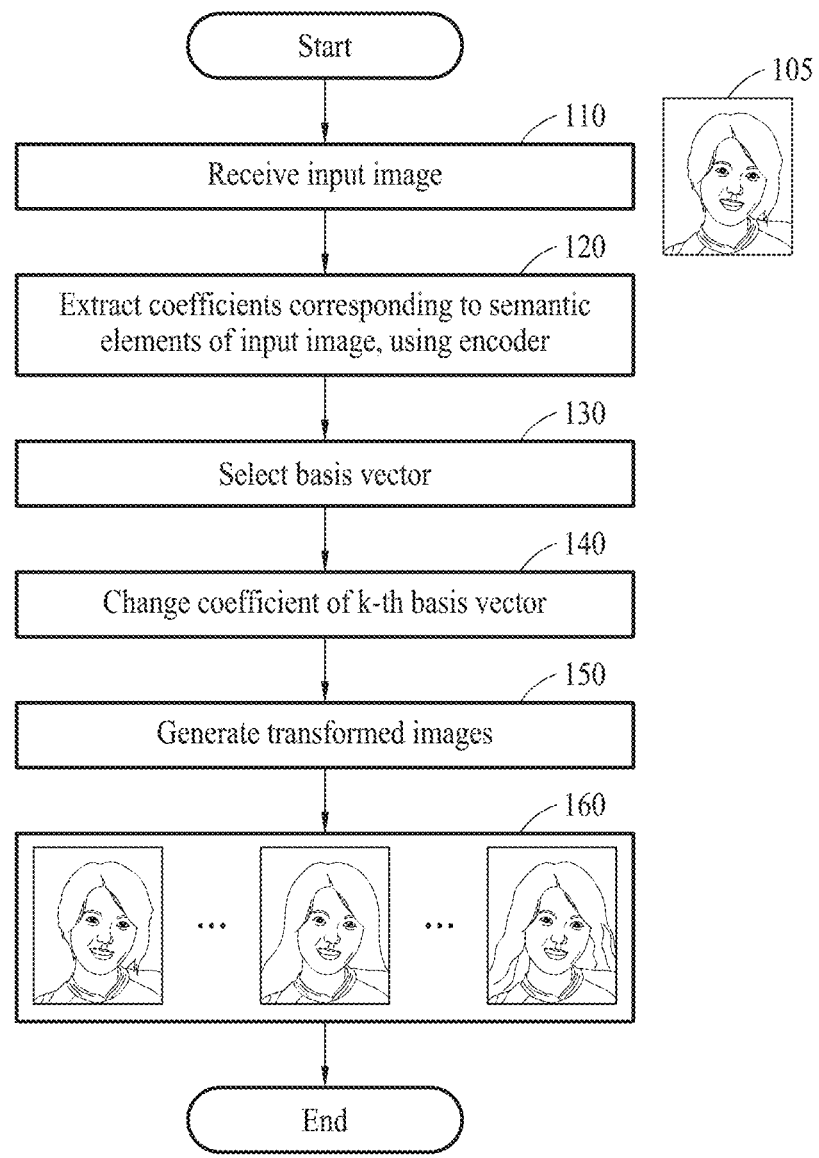
FIG. 1 illustrates an example of an overview of a method of generating a transformed image.

Throughout the drawings and the detailed description, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms of "first" or "second" are used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

The terminology used herein is for the purpose of describing particular examples only and is not to be limiting of the examples. As used herein, the singular forms "a," "an," and "the" are intended to include the plural forms as well, unless the context clearly indicates otherwise. As used herein, the term "and/or" includes any one and any combination of any two or more of the associated listed items. As used herein, the terms "include," "comprise," and "have" specify the presence of stated features, numbers, operations, elements, components, and/or combinations thereof, but do not preclude the presence or addition of one or more other features, numbers, operations, elements, components, and/or combinations thereof.

The use of the term "may" herein with respect to an example or embodiment (for example, as to what an example or embodiment may include or implement) means that at least one example or embodiment exists where such a feature is included or implemented, while all examples are not limited thereto.

Unless otherwise defined, all terms used herein including technical or scientific terms have the same meanings as those generally understood consistent with and after an understanding of the present disclosure. Terms, such as those defined in commonly used dictionaries, are to be construed to have meanings matching with contextual meanings in the relevant art and the present disclosure, and are not to be construed to have an ideal or excessively formal meaning unless expressly so defined herein.

The features of the examples described herein may be combined in various ways as will be apparent after an understanding of the disclosure of this application. Further, although the examples described herein have a variety of configurations, other configurations are possible as will be apparent after an understanding of the disclosure of this application.

FIG. 1 illustrates an example of an overview of a method of generating a transformed image. More specifically, FIG. 1 illustrates a process by which an apparatus (hereinafter, referred to as a "generation apparatus") for generating a transformed image generates various transformed images 160 from a real input image 105 through operations 110 to 150, for example.

In operation 110, the generation apparatus may receive the real input image 105. In operation 110, the generation apparatus may receive the input image 105 together with a selection of a basis direction in which the input image 105 is to be transformed. The term "basis" used herein may be an arbitrary vector space and may be construed to indicate linear independent vectors that linearly generate a corresponding vector space. In other words, the basis may correspond to vectors that provide a unique representation by linear coupling to any vector in the vector space. Accordingly, the basis may also be expressed as a "basis vector". Hereinafter, the term "basis" may be construed to have the same meaning as "basis vector(s)" even though there is no separate description.

Also, the "basis direction in which the input image 105 is to be transformed" may be understood as a transformation direction of an expression element to be transformed among meaningful expression elements that may be transformed or changed in an image. Hereinafter, meaningful expression elements that may be transformed or changed in an image may be referred to as "semantic elements". For example, various transformable expression elements, for example, a hairstyle, an eye color, an eye size, a hair color, gender, age, or a facial expression, in an image including a face of a user may correspond to semantic elements. However, sematic elements are not limited to the foregoing examples. Each of the basis vectors may correspond to a vector representing a predetermined semantic element. Also, the basis direction in which an input image is to be transformed may be construed to include both a direction and a degree of a change in a target coefficient corresponding to a target semantic element to be changed among semantic elements of an input image.

In operation 120, the generation apparatus may extract coefficients respectively corresponding to semantic elements of the input image 105, using an encoder.

In operation 130, the generation apparatus may select a basis vector corresponding to a target semantic element corresponding to the basis direction in which the input image 105 is to be transformed. In operation 130, the generation apparatus may determine which one of basis vectors corresponds to the target semantic element. For example, when the target semantic element corresponds to a k-th basis vector among the basis vectors, the generation apparatus may select the k-th basis vector.

In operation 140, the generation apparatus may change a coefficient of the k-th basis vector selected in operation 130. For example, the generation apparatus may change a semantic element of the input image 105 by changing a size of the coefficient of the k-th basis vector.

In operation 150, the generation apparatus may generate the transformed images 160 from the input image 105, by applying coefficients of basis vectors including the coefficient changed in operation 140 to basis vectors of the input image 105. For example, the k-th basis vector selected in operation 130 may correspond to a hairstyle among semantic elements. In this example, the transformed images 160 may be images that are transformed from the input image 105 representing a short hairstyle, and that represent hairs getting longer.

In an example, a semantic change of an input image may be generated by changing a coefficient of a basis vector corresponding to a target semantic element, and thus it is possible to easily identify a vector that generates an input image in an embedding space that will be described below, and determine whether a semantic element to be changed changes when a vector is changed in the embedding space.

Figure 2A:
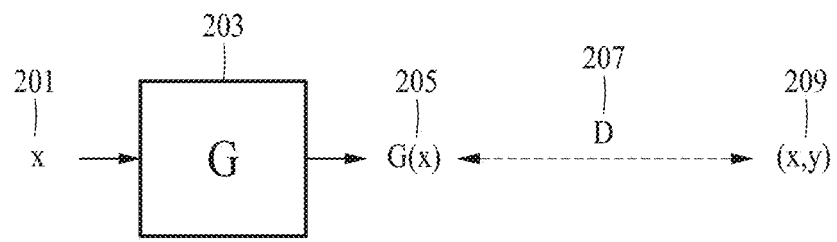
FIGS. 2A to 2C illustrate an example of a basic structure of a generative adversarial network (GAN) model and examples of training a GAN model.
Figure 2B:
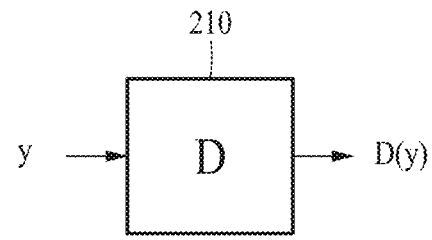
Figure 2C:
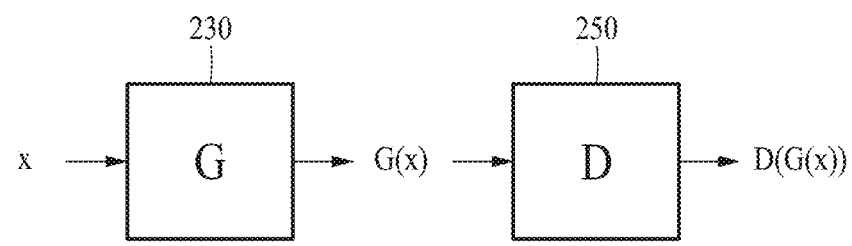

FIGS. 2A to 2C illustrate an example of a basic structure of a generative adversarial network (GAN) model and examples of training a GAN model.

FIG. 2A illustrates a basic structure of a GAN model. Referring to FIG. 2A, training-based image-to-image transformation may be performed to train an image generation neural network 203 that transforms an input x 201.

The image generation neural network 203 may generate a fake image that is extremely similar to training data (for example, the input x 201) in order to deceive an image discrimination neural network 207. The image generation neural network 203, together with the image discrimination neural network 207, may be trained using an adversarial loss. Thus, the image generation neural network 203 may generate a more realistic image. The adversarial loss may correspond to a loss for deceiving the image discrimination neural network 207 that a first synthesized image G(x) 205 generated by the image generation neural network 203 is "true". The image generation neural network 203 may also be referred to as a "generator G" because the image generation neural network 203 generates an image.

The image discrimination neural network 207 may aim to discriminate a real image of the training data from a fake image, for example, the first synthesized image G(x) 205, that is generated by the image generation neural network 203. The GAN model may increase a discrimination ability of the image discrimination neural network 207 and may train the image generation neural network 203 together with the image discrimination neural network 207 so that the image generation neural network 203 may effectively deceive the image discrimination neural network 207. Through the above training, the image generation neural network 203 may generate a fake image at a level in which it is impossible to ultimately distinguish between a real image and the fake image, and the discrimination ability of the image discrimination neural network 207 may also be enhanced.

The image discrimination neural network 207 may also be referred to as a "discriminator D" because the image discrimination neural network 207 discriminates whether a corresponding image is a real image or a fake image. Examples of training the image generation neural network 203 and the image discrimination neural network 207 of the GAN model will be further described below with reference to FIGS. 2B and 2C.

FIG. 2B illustrates a process of training an image discrimination neural network D 210 using a real image. In FIG. 2B, the image discrimination neural network D 210 may discriminate between a real image and a fake image. For example, the image discrimination neural network D 210 may be trained to output "1" or "true" for the real image and to output "0" or "false" for the fake image.

A training apparatus may train the image discrimination neural network 210 to estimate a target image y included in training data or image information of the target image y as a real image.

FIG. 2C illustrates a process of training an image generation neural network 230 and an image discrimination neural network 250 using a synthesized image G(x), that is, a transformed image. In FIG. 2C, the image discrimination neural network 250 may discriminate between a real image and a synthesized image. For example, the image discrimination neural network 250 may be trained to output "1" for the real image and to output "0" for the synthesized image.

The image generation neural network 230 may generate the synthesized image G(x) by receiving an input x. The image generation neural network 230 may be trained to deceive the image discrimination neural network 250 with the generated synthesized image G(x) and to output "1".

The training apparatus may train the image discrimination neural network 250 to estimate a first synthesized image as a fake image by an adversarial loss.

Examples of operations of the image generation neural network 230 and the image discrimination neural network 250 will be described in more detail with reference to Equation 1 shown below.

$$L_{GAN}(G,D,X,Y)=E_{y\sim Pdata}(y)[\log D(y)]+E_{x\sim Pdata(x)}[\log(1-D(G(x))] \quad \text{Equation 1}$$

An operation will be described below from the perspective of the image discrimination neural network 250.

In Equation 1, y~Pdata(y) is a probability density function and indicates sampling of a distribution of real data. For example, y~Pdata(y) may indicate that a value of y is extracted one by one from "1000" target images (for example, pedestrian images) if the "1000" target images are included in training data.

The image discrimination neural network 250 may need to output a value close to "1" for the real image, and thus the image discrimination neural network 250 may be expressed mathematically to maximize a value of [log D (y)]. The image discrimination neural network 250 may output a value between "0" and "1".

In x~Pdata(x), x may be a random value. Also, x may be input to the image generation neural network 230. For example, the image generation neural network 230 may perform sampling of a multi-dimensional vector based on a Gaussian distribution. For example, if a random multi-dimensional vector x is received, the image generation neural network 230 may generate a synthesized image of a second domain from a synthesized image of a first domain. If G(x) is received, the image discrimination neural network 250 may need to output a value close to "0", which may be mathematically expressed as [log(1−D(G(x))].

An operation will be described below from the perspective of the image generation neural network 230.

Since a value of $E_{y\sim Pdata(y)}$ [log D (y)] in Equation 1 needs to be minimized and the image generation neural network 230 is not used to train the image discrimination neural network 250, y~Pdata(y) in Equation 1 may correspond to a portion in which involvement of the image generation neural network 230 is impossible.

Thus, the image generation neural network 230 may be trained so that $E_{x\sim Pdata(x)}$ [log(1−D(G(x))] in Equation 1 may be minimized. Unlike the image discrimination neural network 250, the image generation neural network 230 may be trained to allow D(G(x)) to be "1".

Figure 3:
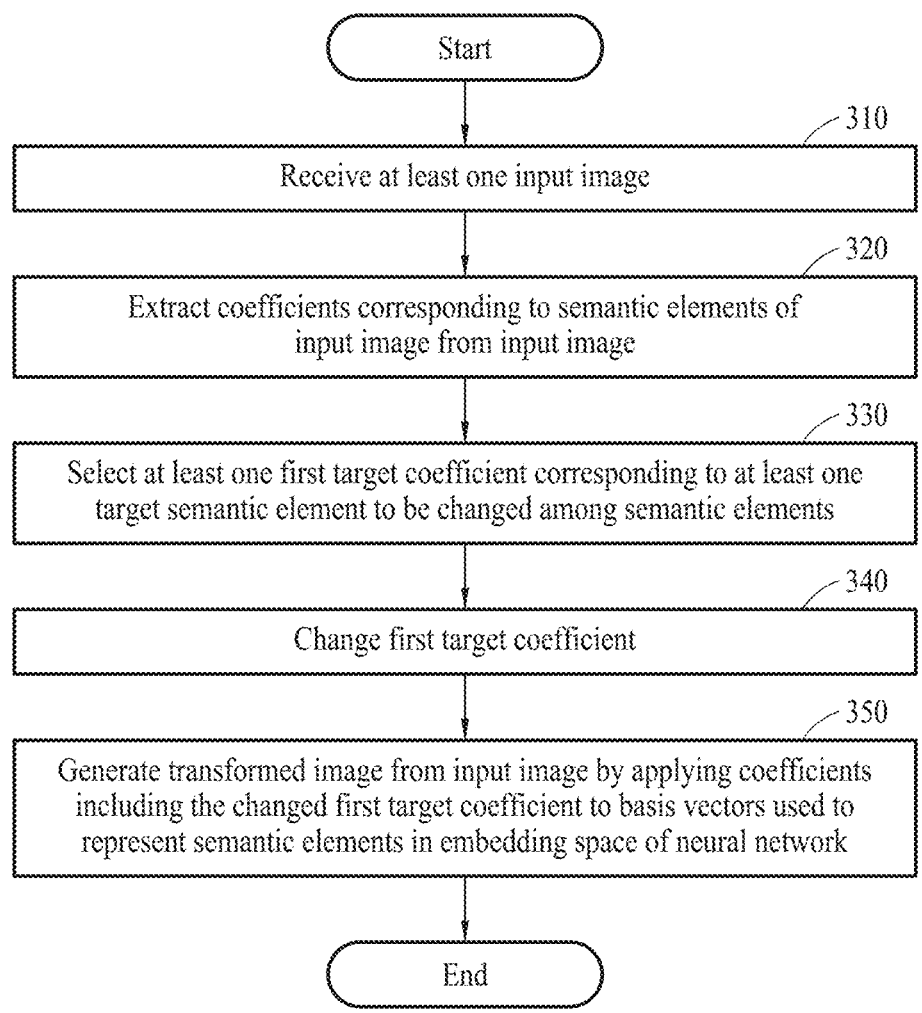
FIG. 3 illustrates an example of a method of generating a transformed image.

FIG. 3 illustrates an example of a method of generating a transformed image. More specifically, FIG. 3 illustrates a process by which a generation apparatus generates a transformed image through operations 310 to 350, for example.

In operation 310, the generation apparatus may receive at least one input image. The at least one input image may be, for example, an image received from the outside of the generation apparatus, or an image captured by a sensor included in the generation apparatus. The input image may include, but is not limited to, for example, objects with various expression elements that may change, such as people, animals, plants, vehicles, or buildings.

In operation 320, the generation apparatus may extract coefficients corresponding to semantic elements of the input image received in operation 310 from the input image. The semantic elements may include, but are not limited to appearance attributes, for example, gender, age, race, a pose, a facial expression and a size of an object included in the input image, a color, a shape, a style, a pose, a size and a position of each element of the object, and glasses, hats, accessories, and clothes added to the object.

For example, when the input image is a "puppy" image, the generating apparatus may extract coefficients corresponding to semantic elements (for example, a breed, age, gender, a head, ears, a mouth, a tail, a body, a foot color, a shape, a style, a size, a position, a hair shape, and/or a pose of a puppy) that are various expression elements that may be changed in the puppy image. For example, when ten semantic elements are present, the generation apparatus may extract ten coefficients corresponding to the ten semantic elements.

In operation 330, the generation apparatus may select at least one first target coefficient corresponding to at least one target semantic element to be changed among the semantic elements. For example, the generation apparatus may select a first target coefficient using a matching table that represents a matching relationship between semantic elements and coefficients. The matching table may include information about which one of coefficients of basis vectors matches each of the semantic elements. For example, when a plurality of target semantic elements to be changed are present, the generation apparatus may select first target coefficients respectively corresponding to a plurality of semantic elements.

In operation 340, the generation apparatus may change the first target coefficient selected in operation 330. The generation apparatus may determine at least one of a direction and a degree of a change in the first target coefficient. The generation apparatus may change the first target coefficient based on at least one of the direction and the degree of the change in the first target coefficient.

For example, when at least one target semantic element to be changed selected in operation 330 is a hairstyle of a user, the generation apparatus may determine a direction of a change in a target coefficient corresponding to the hairstyle to be one of a first direction in which the hairstyle is changed from straight hair to curly hair or permed hair and a second direction in which the hairstyle is changed from a shot hairstyle to a long hairstyle, or a direction including both the first direction and the second direction. Also, the generation apparatus may determine a degree of the change in the target coefficient, for example, a degree of hair curl as a predetermined degree (for example, "6") between a degree "1" indicating partially (e.g., slightly) curly hair and a degree "10" indicating very curly hair, or may determine a length of hair as a predetermined degree (for example, "4" corresponding to bobbed hair) between a degree "1" indicating very short hair and a degree "10" indicating very long hair. The generation apparatus may change the target coefficient by increasing or reducing a value of the target coefficient based on the determined direction and the determined degree of the change in the target coefficient.

In operation 350, the generation apparatus may generate a transformed image from the input image by applying coefficients including the first target coefficient changed in operation 340 to basis vectors used to represent semantic elements in an embedding space of a neural network. The basis vectors may correspond to the semantic elements. The embedding space will be further described with reference to description of a structure and an operation of a neural network in FIG. 4.

Depending on examples, the generation apparatus may also change the first target coefficient using selected target coefficients corresponding to at least one target semantic element from a plurality of input images. An example of a process by which the generation apparatus generates a transformed image by changing the first target coefficient using target coefficients selected from a plurality of input images will be further described below with reference to FIG. 6.

Figure 4:
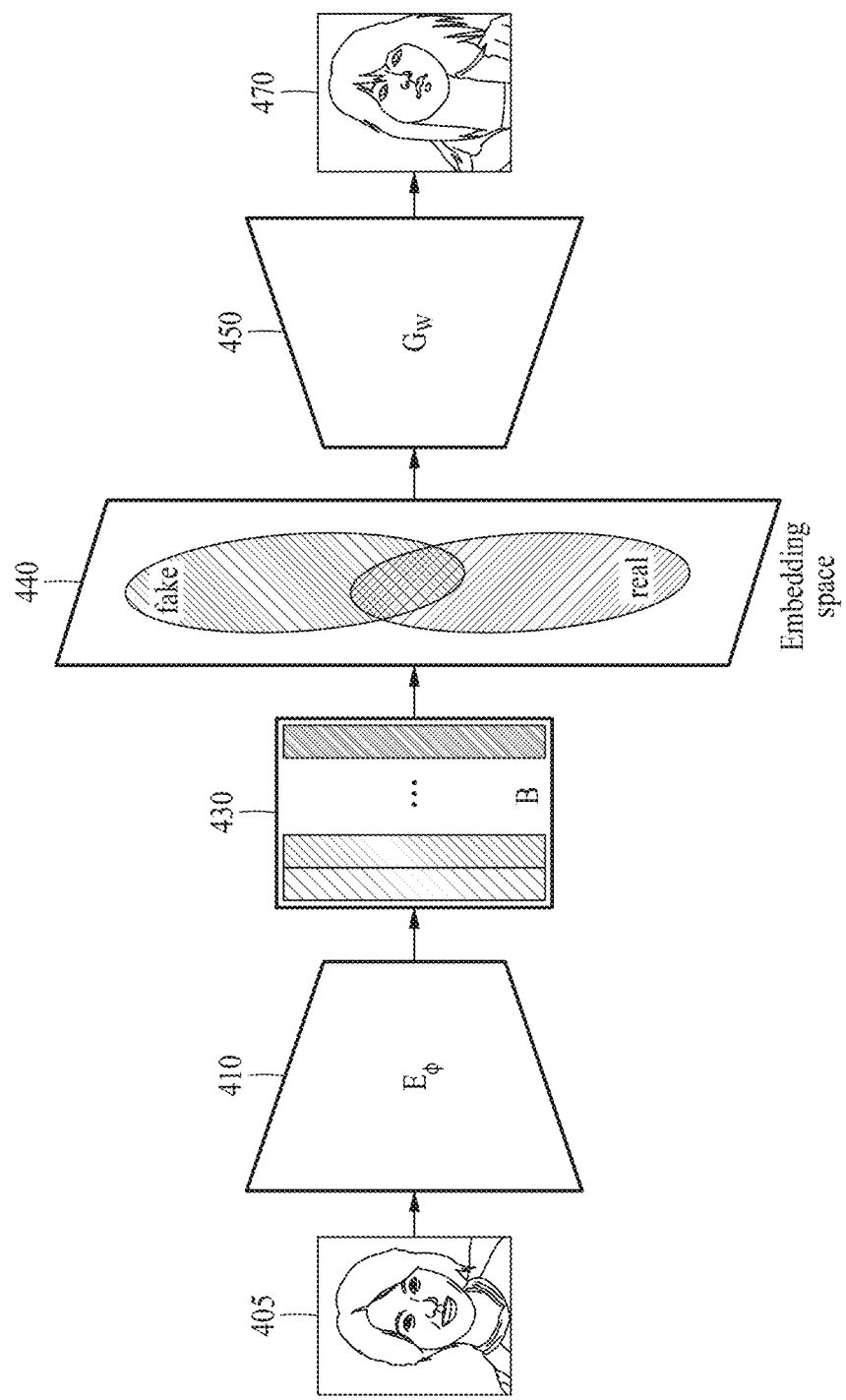
FIG. 4 illustrates an example of a structure and an operation of a neural network.

FIG. 4 illustrates an example of a structure and an operation of a neural network. FIG. 4 illustrates a structure of a neural network that generates a transformed image 470 from an input image 405.

The neural network of FIG. 4 may include, for example, an encoder Eø 410, basis vectors B 430, an embedding space 440, and a generator Gw 450.

The encoder Eø 410 may estimate coefficients of the basis vectors B 430 to map the input image 405 to the embedding space 440 through the basis vectors B 430, when the input image 405 is applied.

The basis vectors B 430 may be used to represent semantic elements of the input image 405 in the embedding space 440, and may correspond to the semantic elements of the input image 405.

The embedding space 440 may be a space that represents a semantic change by the basis vectors B 430 respectively corresponding to the semantic elements. In other words, the embedding space 440 may correspond to a space in which basis vectors are expanded through the semantic change.

The generator Gw 450 may generate the transformed image 470 by reflecting coefficients corresponding to the semantic elements of the input image 405 to the basis vectors B 430.

In FIG. 4, an input space of the generator Gw 450, and an output space, to which a vector mapped using the encoder ∈ø 410 is projected from the input image 405 based on the basis vectors B 430, may be shared as the embedding space 440.

The input space of the generator Gw 450 and an output space of the encoder Eø 410 may be matched as a single space, that is, the embedding space 440, and thus the transformed image 470 may be easily generated from the input image 405 through a simple operation of changing coefficients of the basis vectors B 430.

The neural network may project a vector mapped using the encoder Eø 410 to the embedding space 440 by basis vectors B 430 that are trained, and may control the basis vectors B 430 to change the semantic elements of an input image. Examples of training the encoder Eø 410, the basis vectors B 430, and the generator Gw 450 will be further described below with reference to FIGS. 5 to 7D.

Figure 5:
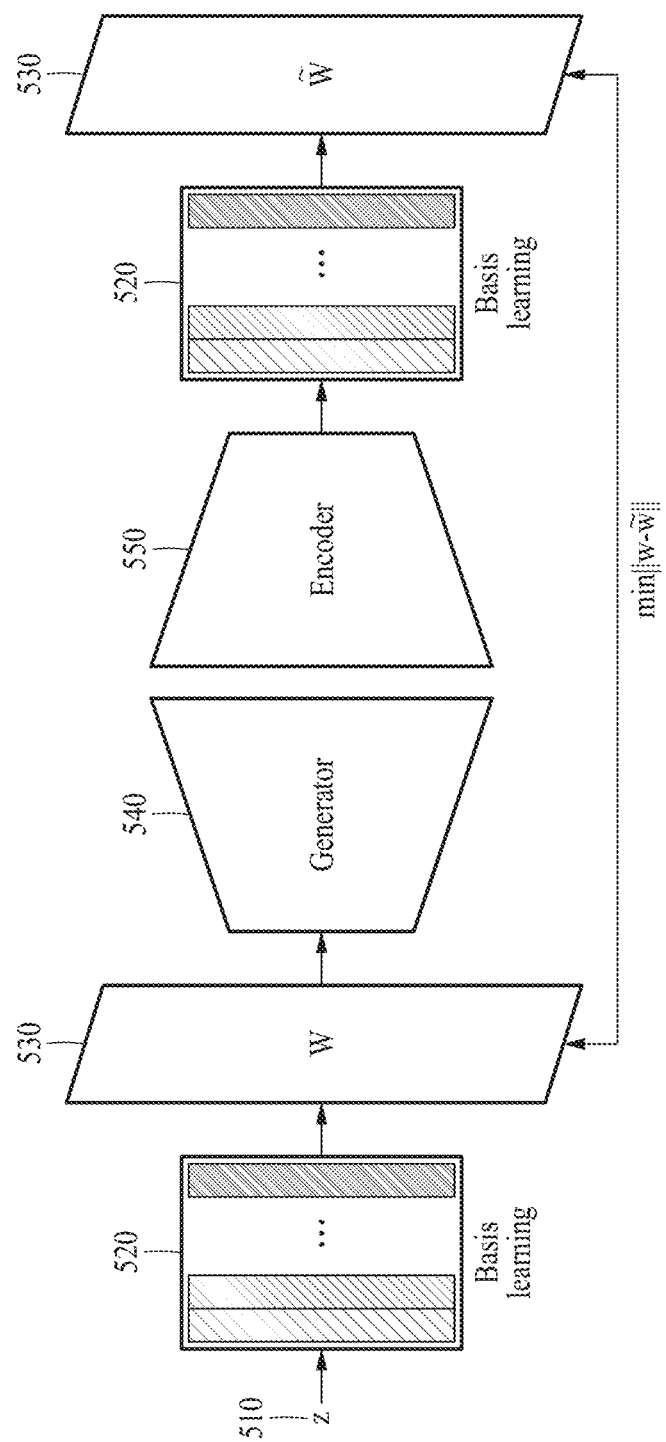
FIG. 5 illustrates an example of training a neural network.

FIG. 5 illustrates an example of training a neural network. FIG. 5 illustrates an embedding space 530 shared by a generator 540 and an encoder 550, and basis vectors 520 trained to represent semantic elements in the embedding space 530.

The generator 540 may receive, as an input, a vector W from the embedding space 530, and may generate a synthesized image. The vector W may be obtained by mapping coefficients extracted from a noise vector z 510 to the embedding space 530 by the basis vectors 520.

Also, the encoder 550 may receive, as an input, the synthesized image generated by the generator 540, and may generate a result vector $\tilde{W}$ by projecting a value sampled from the synthesized image to the embedding space 530 by the basis vectors 520.

Here, an input space in which the generator 540 receives a vector W sampled from the noise vector z 510, and an output space in which a vector W is projected from an input image using the encoder 550 may be matched as the embedding space 530.

A training apparatus may train the basis vectors 520, the generator 540, and the encoder 550, to minimize a difference between the vector W sampled in the embedding space 530 and the vector $\tilde{W}$ in which a synthesized image generated from the vector W is transmitted to the embedding space 530 by the encoder 550 through integrated mapping of the basis vectors 520.

In an example, an embedding space shared by expansion of basis vectors may be defined, and thus the neural network may be trained by a loss that allows an input space of the generator 540 to be matched to an output space of the encoder 550, that is, a loss that minimizes a difference between the vectors W and $\tilde{W}$.

In an example, the neural network may enable consistent mapping between the embedding space 530 and semantic elements of an input image by a neural network trained by the above-described training structure. Unlike the above-described GAN model, the neural network may allow semantic elements of images to be accurately distinguished from each other through a direct connection between the input space of the generator 540 and the embedding space 530 for determining a real image or a fake image, by the training structure shown in FIG. 5. An example of a training structure of a neural network will be further described below with reference to FIGS. 7A to 7D.

Figure 6:
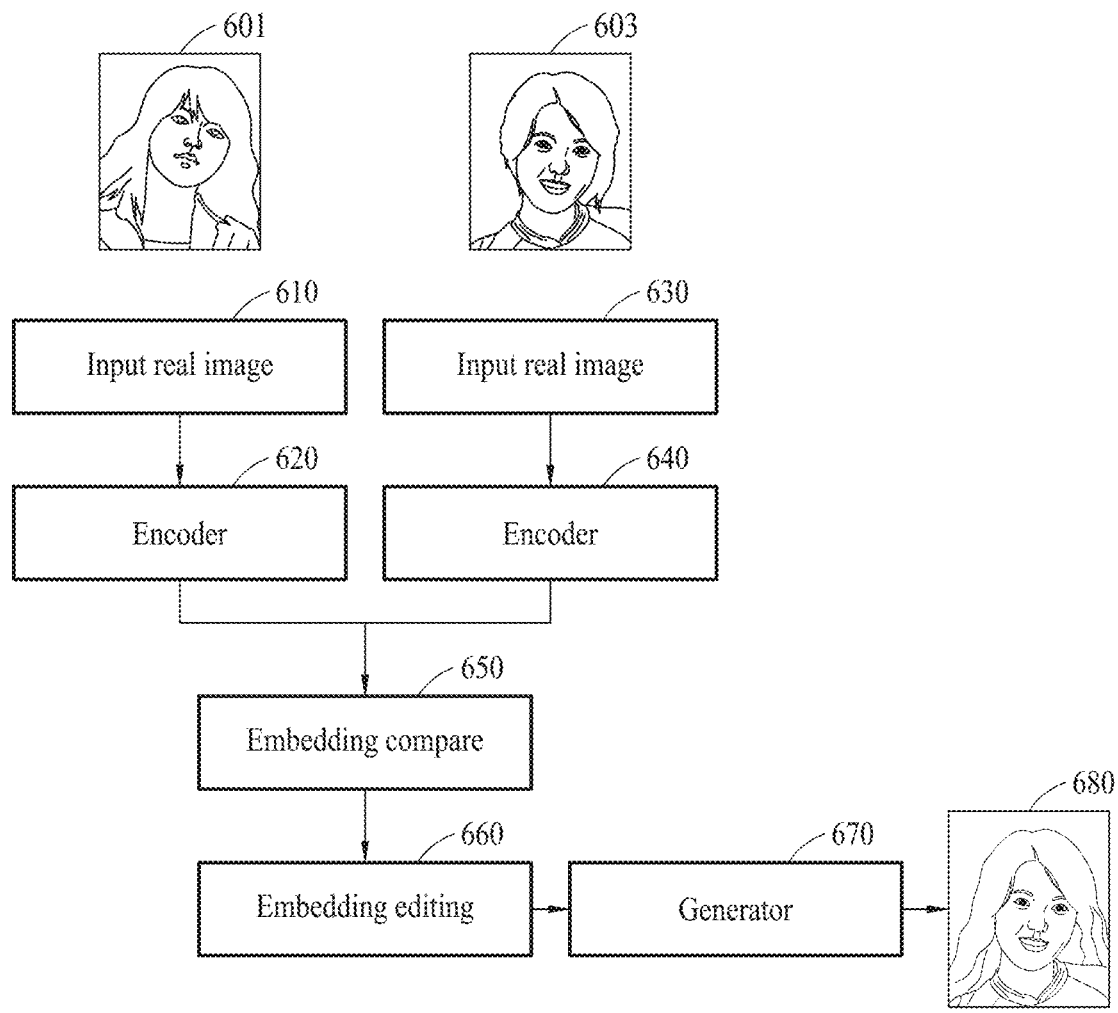
FIG. 6 illustrates an example of a method of generating a transformed image.

FIG. 6 illustrates another example of a method of generating a transformed image. More specifically, FIG. 6 illustrates a process by which a generation apparatus generates a transformed image 680 using target coefficients selected from a plurality of input images 601 and 603 through operations 610 to 670, for example.

In operation 610, the generation apparatus may receive a first input image 601. The first input image 601 may be, for example, an image representing a woman with a long perm hairstyle and an expressionless face. In operation 610, the generation apparatus may receive the first input image 601, together with a selection of a basis direction in which the first input image 601 is to be transformed, that is, at least one target semantic element (for example, a facial expression) to be changed among semantic elements of the first input image 601. An example in which an input image, and a selection of a basis direction in which the input image is to be transformed are received together is described. However, this disclosure is not limited to such an example.

In operation 620, the generation apparatus may extract coefficients respectively corresponding to the semantic elements of the first input image 601 from the first input image 601, using an encoder. In operation 620, the generation apparatus may select at least one first target coefficient corresponding to at least one target semantic element to be changed among the semantic elements of the first input image 601.

In operation 630, the generation apparatus may receive a second input image 603. The second input image 603 may be, for example, an image representing a woman with a short hairstyle and a bright smile showing her teeth.

In operation 640, the generation apparatus may extract coefficients respectively corresponding to semantic elements of the second input image 603 from the second input image 603, using the encoder. In operation 640, the generation apparatus may select at least one second target coefficient corresponding to at least one target semantic element to be changed among the semantic elements of the second input image 603 from the second input image 603.

In operation 650, the generation apparatus may compare the first target coefficient and the second target coefficient, and may determine a target coefficient matching a basis direction in which an input image is to be transformed between the first target coefficient and the second target coefficient as a coefficient value corresponding to a target semantic element, based on a comparison result. In an example, the generation apparatus may determine a value obtained by combining the first target coefficient and the second target coefficient as a target coefficient value corresponding to a target semantic element. In another example, the generation apparatus may determine a value obtained by swapping the first target coefficient with the second target coefficient as a target coefficient value corresponding to a target semantic element.

In another example, the generation apparatus may determine at least one of a direction of a change in the first target coefficient and a degree of the change in the first target coefficient based on a basis direction in which an input image is to be transformed, and may adjust a first weight of the first target coefficient and a second weight of the second target coefficient based on at least one of the determined direction and the determined degree. The generation apparatus may also determine the first target coefficient by combining the first target coefficient reflecting the adjusted first weight and the second target coefficient reflecting the adjusted second weight.

In operation 660, the generation apparatus may edit or change a coefficient of basis vectors by the target coefficient value determined in operation 650.

In operation 670, the generation apparatus may generate the transformed image 680 from the first input image 601 by applying coefficients of the basis vectors including the coefficient edited in operation 660 to basis vectors of the first input image 601. The transformed image 680 may be, for example, an image with a long perm hairstyle and a bright smiling face which is obtained by reflecting a facial expression (for example, a bright smiling expression exposing teeth) of the second input image 603 to the first input image 601.

Figure 7A:
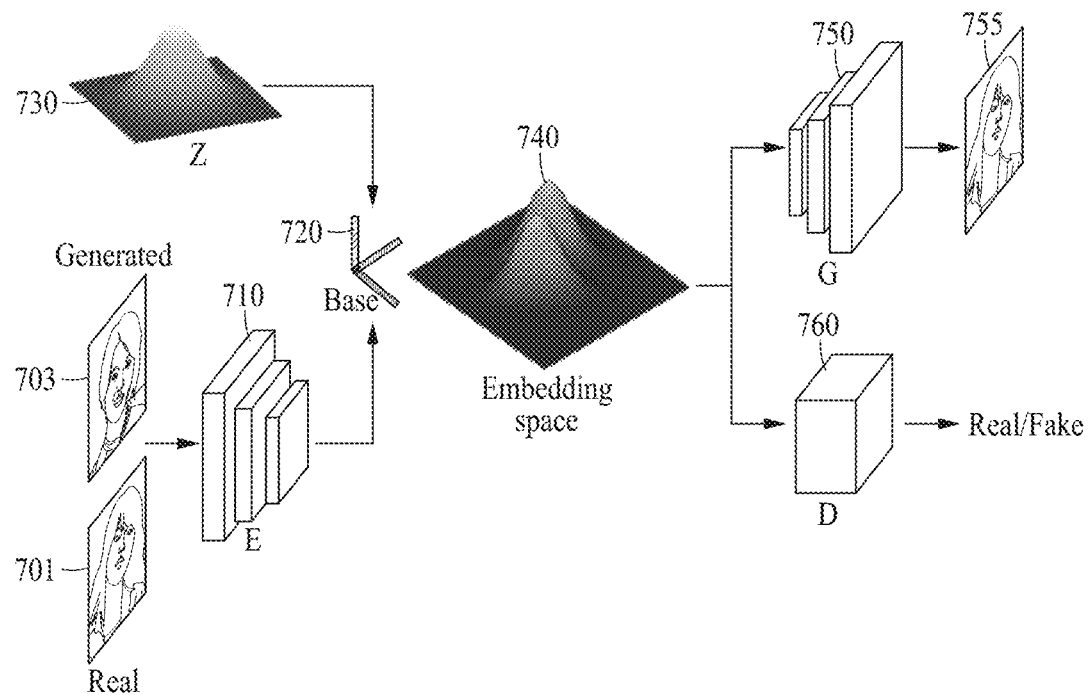
FIGS. 7A to 7D illustrate an example of a training structure of a neural network and examples of operations of components of the neural network.

FIGS. 7A to 7D illustrate an example of a training structure of a neural network and examples of operations of components of the neural network. FIG. 7A illustrates a training structure of a neural network that matches an embedding space through basis vectors. The neural network may include an encoder E 710, basis vectors B 720, an embedding space 740, a generator G 750, and a discriminator D 760. The neural network may be trained by unsupervised learning by an adversarial loss of a GAN model through the training structure of FIG. 7A.

The training structure of FIG. 7A may correspond to, for example, a structure of an adversarial latent autoencoder obtained by combining the above-described GAN model and an autoencoder. A latent space of the GAN model may reflect meaningful semantic information of an image.

In the training structure of FIG. 7A, the image discrimination neural network 210 of FIG. 2B or the image discrimination neural network 250 of FIG. 2C may be decomposed into the encoder E 710 and the discriminator D 760, which may be expressed as D=D∘E. The encoder E 710 may map an image to the embedding space 740, and the discriminator D 760 may classify a real image and a fake image from the embedding space 740.

Since the image discrimination neural network 210 or 250 enforces a real image and a fake image to be matched in an embedding space, an embedding vector may be assumed to have semantic information of images. However, an input space of an image generation neural network may be weakly connected to the embedding space through a generator and an encoder. Thus, the GAN model may be weak in disentanglement and controllability properties, in comparison to a structure of an autoencoder.

For example, an input of the generator 203 of the GAN model of FIG. 2A may be a vector sampled from a prior distribution (~N(0,1)) and may not be directly mapped to meaningful semantic information for each vector, and accordingly the GAN model may have entangled properties. Unlike the GAN model, the autoencoder may generate an image in response to an input of an embedding vector extracted from an input image, and accordingly the autoencoder may have disentanglement and controllability properties stronger than the GAN model.

Thus, through a structure in which an input space of the generator G 750 and an output space of the encoder E 710 are directly connected, a strong mapping relationship between semantic elements of the input image 701 and the basis vectors B 720 of the embedding space 740 may be maintained. A training apparatus may train the basis vectors B 720, to enable representations classified by semantic elements and to easily analyze various semantic changing directions by semantic elements corresponding to the basis vectors B 720.

For example, the training apparatus may train the basis vectors B 720 so that the input space (or a latent space) of the generator G 750 and a space of the discriminator D 760 may be directly connected as one embedding space, that is, the embedding space 740. In this example, the basis vectors B 720 of the embedding space 740 may be assumed to represent predetermined semantic elements of the input image 701 and an image 703.

The basis vectors B 720 used to represent semantic elements of an input image in the embedding space 740 will be described below.

For example, when the basis vectors B 720 are expressed as a matrix $B \in \mathbb{R}^{k \times k}$, k may denote a dimension of the embedding space 740, and a column vector $B_i$ of the matrix B may correspond to a basis element of the embedding space 740. The matrix B may span the embedding space 740 and may be updated simultaneously with the generator G 750.

In an example, the input space of the generator G 750 (or a decoder of an autoencoder) and the output space of the encoder E 710 may be directly connected as a single space, that is, the embedding space 740, based on training, and thus it is possible to minimize a discrepancy between an input distribution of the generator G 750 and an output distribution of the encoder E 710.

In an example, a semantic changing direction may be identified through trained basis vectors without a latent traversal process.

The training apparatus may allow basis vectors to learn various attribute changes through change directions of basis vectors, and may allow the basis vectors to reflect semantic mapping occurring during training.

Figure 7B:
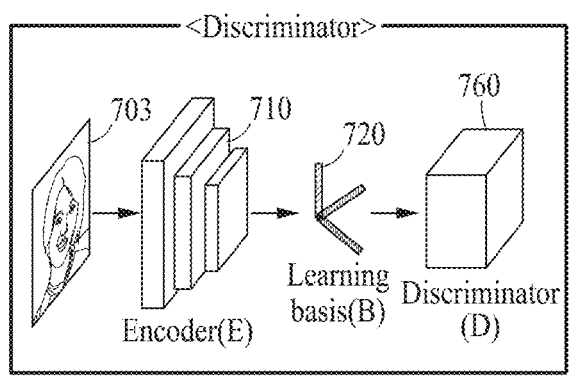

FIG. 7B illustrates an operation of the discriminator D 760.

For example, when the image 703 generated by the generator G 750 is received, the encoder E 710 may extract coefficients corresponding to semantic elements of the image 703 from the image 703, and may generate a transformed image by applying the extracted coefficients to the basis vectors B 720. The discriminator D 760 may discriminate whether the transformed image is a real image or a fake image.

Figure 7C:
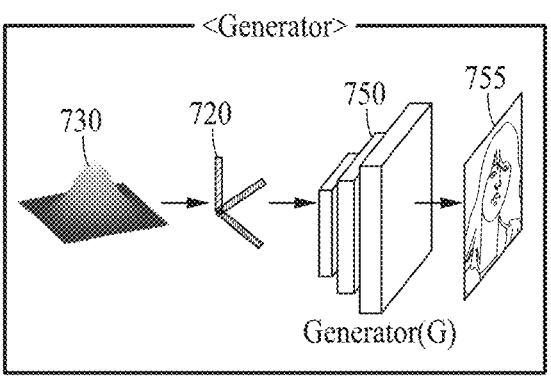

FIG. 7C illustrates an operation of the generator G 750.

The generator G 750 may generate an image 755 by reflecting coefficients extracted corresponding to the latent vector N 730 to the basis vectors B 720 of the embedding space 740. The generator G 750 may synthesize the image 755 in the embedding space 740, to provide more comprehensive properties to the embedding space 740.

For example, an image generated by inputting the latent vector Z 730 to the generator G 750, and an output of the discriminator D 760 may be assumed to be $G_z$, and $f_z$, respectively. In this example, the image $G_z$ generated by the generator G 750 and the output $f_z$ of the discriminator D 760 may be represented as shown in Equation 2 below.

$$G_N = G \circ B(z), f_z = D \circ B \circ E(G_z) \qquad \text{Equation 2}$$

Equation 2 may show that an input vector of the generator G 750 and the output $f_z$ of the discriminator D 760 are in the same space (for example, the embedding space 740) spanned by the basis vectors B 720. In other words, the discriminator D 760 may directly determine whether a corresponding image is a real image or a fake image, based on information received by the generator G 750 for image generation.

The discriminator D 760 may need to specifically identify various images, to accurately verify authenticity of images. For example, the discriminator D 760 may determine authenticity of an image based on the same vector information as that of an input of the generator G 750, and thus the authenticity of the image may be discriminated by accurately reflecting semantic information.

The discriminator D 760 may map the semantic elements of the image 703 to the embedding space 740 through training of the basis vectors B 720, to naturally generate a relationship between the basis vectors B 720 and semantic elements of an image.

Since the encoder E 710 maps the image 703 to the embedding space 740 through the basis vectors B 720, semantic elements (hereinafter, referred to as "basis elements") corresponding to the basis vectors B 720 may correspond to semantical meanings. In an example, a semantical meaning of each of the basis elements may be identified by changing coefficients of the basis vectors B 720.

In an example, auxiliary networks may be adopted to obtain linear properties of the basis vectors B 720 and refer a residual predictor R 770.

Figure 7D:
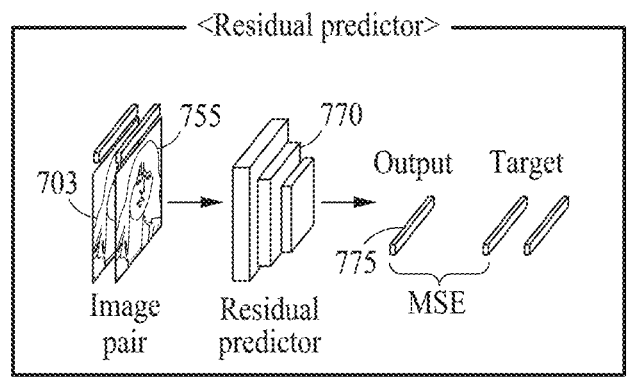

FIG. 7D illustrates an operation of the residual predictor R 770. The residual predictor R 770 may predict an embedding difference between the images 703 and 755 that are received. In an example, using the residual predictor R 770, more linear image changes may be mapped to the embedding space 740 and the basis vectors B 720.

For example, an image obtained by concatenating two generated images, two sampled real images, or the images 703 and 755 may be applied as an input to the residual predictor R 770. The residual predictor R 770 may be trained together with the generator G 750, to set a difference value in a process of embedding the images 703 and 755.

In a training process, since the residual predictor R 770 more accurately predicts a residual between the images 703 and 755, various semantic changes of images may be more easily distinguished from each other and mapped to an embedding vector. In an example, through the residual predictor R 770, a space in which the basis vectors B 720 extend may be disentangled.

For example, if $l_1$ and $l_2$ are assumed as two sampled images, outputs $f_{I_1}=B(E(I_1))$ and $f_{I_2}=B(E(I_2))$ of the residual predictor R 770 may respectively correspond to embedding vectors of the images $l_1$ and $l_2$. In this example, the embedding vectors may be an input of the generator G 750 and an output of the encoder E 710, respectively, and accordingly a semantic element of each of the basis vectors B 720 may represent a meaning of an image. Thus, a semantic difference of $l_1$ and $l_2$ may be represented by $f_{I_1}$, $f_{I_2}$.

When an image $[I_1:I_2]$ obtained by concatenating the images $l_1$ and $l_2$ is received, the residual predictor R 770 may predict an embedding difference of image pairs. A relationship between an output 775 of the residual predictor R 770 and the images 703 and 755 may be established as shown in Equation 3 below.

$$R([I_1:I_2]) \approx (f_{I_1} - f_{I_2}) \quad \text{Equation 3}$$

In an example, using the residual predictor R 770, both a real image and a generated image may be predicted, and an embedding space difference may be predicted. The residual predictor R 770 may simultaneously optimize the real image and the generated image.

A goal of training a general GAN model may be to find a Nash equilibrium of pair of the generator G 750 and the discriminator D 760 through a value function V as shown in Equation 4 below.

$$V(G,D) = \mathbb{E}_{pD(x)}[f(D(x))] + \mathbb{E}_{p(z)}[f - D(G(z))] \quad \text{Equation 4}$$

In Equation 4, E denotes an expectation, and $f: \mathbb{R} \to \mathbb{R}$ denotes a concave function. For example, if $f(x) = -\log(1+\exp(-x))$ a formulation of the GAN model of FIGS. 2A to 2C may be obtained.

Since the input space of the generator G 750 and the output space of the encoder E 710 are matched as the embedding space 740, a neural network may be trained by applying a latent autoencoder loss $L_{LALE}$. The latent autoencoder loss $L_{LALE}$ in the training structure of FIG. 7A may be represented as shown in Equation 5 below.

$$L_{LALE} = \min_{G,E} \|B(z) - B \circ E \circ G \circ B(z)\|_2^2 \quad \text{Equation 5}$$

In an example, the latent autoencoder loss $L_{LALE}$ may be optimized, to reverse a generated image into an embedding space. When a real distribution corresponding to a real image and a generated distribution corresponding to a generated image are matched in the embedding space 740, the real image may be reversed to an embedding vector.

To have disentanglement properties, the residual predictor R 770 may be optimized using a loss of Equation 6 shown below, and the generator G750 may be optimized using a loss of Equation 7 shown below.

$$L_{RP_r} = \min_{G,R} \|R([G \circ B(z_1) : G \circ B(z_2)]) - (B(z_1) - B(z_2))\| \quad \text{Equation 6}$$

$$L_{RP_g} = \min_{G,R} \|R([I_1:I_2]) - (B \circ E(I_1) - B \circ E(I_2))\| \quad \text{Equation 7}$$

In Equations 6 and 7, sampled latent vectors $Z_1$, $Z_2$ may form a latent space, and real images $I_1$, $I_2$ may be sampled from training data.

A training process for components of the neural network of FIG. 7A, for example, the encoder E 710, the basis vectors B 720, the generator G 750, the discriminator D 760, and the residual predictor R 770, may be represented as shown in Table 1 below.

TABLE 1

| Algorithm 1 Share Embedding Basis Algorithm |
|---|
| 1:      Initialize network parameters $\theta_B$, $\theta_E$, $\theta_G$, $\theta_D$, $\theta_R$. |
| 2:      while not conveged do |
| 3:      Step 1. Update E and D |
| 4:      x ← Random mini-batch from dataset |
| 5:      z ← Sample from prior N (0, 1) |
| 6:      $L_{adv}^{E,D} \leftarrow$ softmax (D ○ B ○ E ○ G ○ B(z)) + softmax $(D \circ B \circ E(x)) + \frac{\gamma}{2}\mathbb{E}_{pD(x)}\|\nabla D \circ B \circ E(x)\|^2$ |
| 7:      $\theta_E, \theta_D \leftarrow \text{RMSProp}(\nabla_{\theta_E,\theta_D}, L_{adv}^{E,D}, \theta_E, \theta_D)$ |
| 8:      Step 2. Update B and G |
| 9:      z ← Sample from prior N(0, 1) |
| 10:     $L_{adv}^{B,G} \leftarrow$ softmax (−D ○ B ○ E ○ G ○ B(z)) |
| 11:     $\theta_B, \theta_G \leftarrow \text{RMSProp}(\nabla_{\theta_E,\theta_D}, L_{adv}^{E,D}, \theta_E, \theta_D)$ |
| 12:     Step 3. Update G and E |
| 13:     z ← Sample from prior N(0, 1) |
| 14:     $L_{LALE}^{E,G} \leftarrow \|B(z) - E \circ G \circ B(z))\|_2^2$ |
| 15:     $\theta_E, \theta_G \leftarrow \text{RMSProp}(\nabla_{\theta_E,\theta_G}, L_{adv}^{E,G}, \theta_E, \theta_G)$ |
| 16:     Step 4. Update G and R |
| 17:     $x_1$, $x_2$ ← Random mini-batch from dataset |
| 18:     $z_1$, $z_2$ ← Sample from prior N(0, 1) |
| 19:     $L_{RP} \leftarrow \|R([G \circ B(z_1) : G \circ B(z_2)]) - (B(z_1) - B(z_2))\|_2^2 + \|R(x_1 : x_2]) - (B \circ E(I_1) - B \circ E(I_2))\|_2^2$ |
| 20:     $\theta_G, \theta_R \leftarrow \text{RMSProp}(\nabla_{\theta_R,\theta_G}, L_{adv}^{E,G}, \theta_E, \theta_G)$ |
| 21:     end while |

To optimize Equations 4 to 7 described above, the components of the neural network, for example, the encoder E 710, the basis vectors B 720, the generator G 750, the discriminator D 760, and the residual predictor R 770, may be alternately updated.

In Table 1, operations associated with Equation 4 may be expressed as Step 1 of lines 3 to 7 and Step 2 of lines 8 to 11. Also, in Table 1, operations associated with Equation 5 may be expressed as Step 3 of lines 12 to 15, and operations associated with Equations 6 and 7 may be expressed as Step 4 of lines 16 to 20.

Parameters $\theta_B$, $\theta_G$, $\theta_E$, $\theta_D$, $\theta_R$ of the basis vectors B 720, the generator G 750, the encoder E 710, the discriminator D 760, and the residual predictor R 770 may be randomly initialized.

For more stable training, a gradient penalty term $R_1$ defined as $$\frac{\gamma}{2}\mathbb{E}_{pD(x)}\|\nabla D \circ B \circ E(x)\|$$

may be used.

In an example, $R_1$ regularization for real data may be performed, and a gradient may be taken for parameters of the encoder E 710 and the discriminator D 760.

In Table 1, Step 1 and Step 2 may correspond to an optimization process for an adversarial loss. Step 3 may be an optimization process for a latent autoencoder loss, and the parameter $\theta_G$ of the generator G 750 and the parameter $\theta_E$ of the encoder E 710 may be optimized. Step 4 may be an optimization process for a prediction loss, and the parameter $\theta_R$ of the residual predictor R 770 and the parameter $\theta_D$ of the discriminator D 760 may be optimized by Equations 6 and 7.

In an example, when the parameters $\theta_B$ are updated in several steps, training may fail due to a distribution draft of an embedding space in which the generator G 750 and the discriminator D 760 are trained. Thus, for stable training of the GAN model, the parameters $\theta_B$ of the basis vectors B 720 may be updated at only Step 2 that is a process of updating the generator G 750.

In an example, when the parameters $\theta_B$ are updated, the parameter $\theta_G$ may be simultaneously updated so that the generator G 750 may have a larger number of disentangled properties. In an example, Resnet 18 may be used as a residual prediction variable of the residual predictor R 770, and six input channels may be used.

Figure 8:
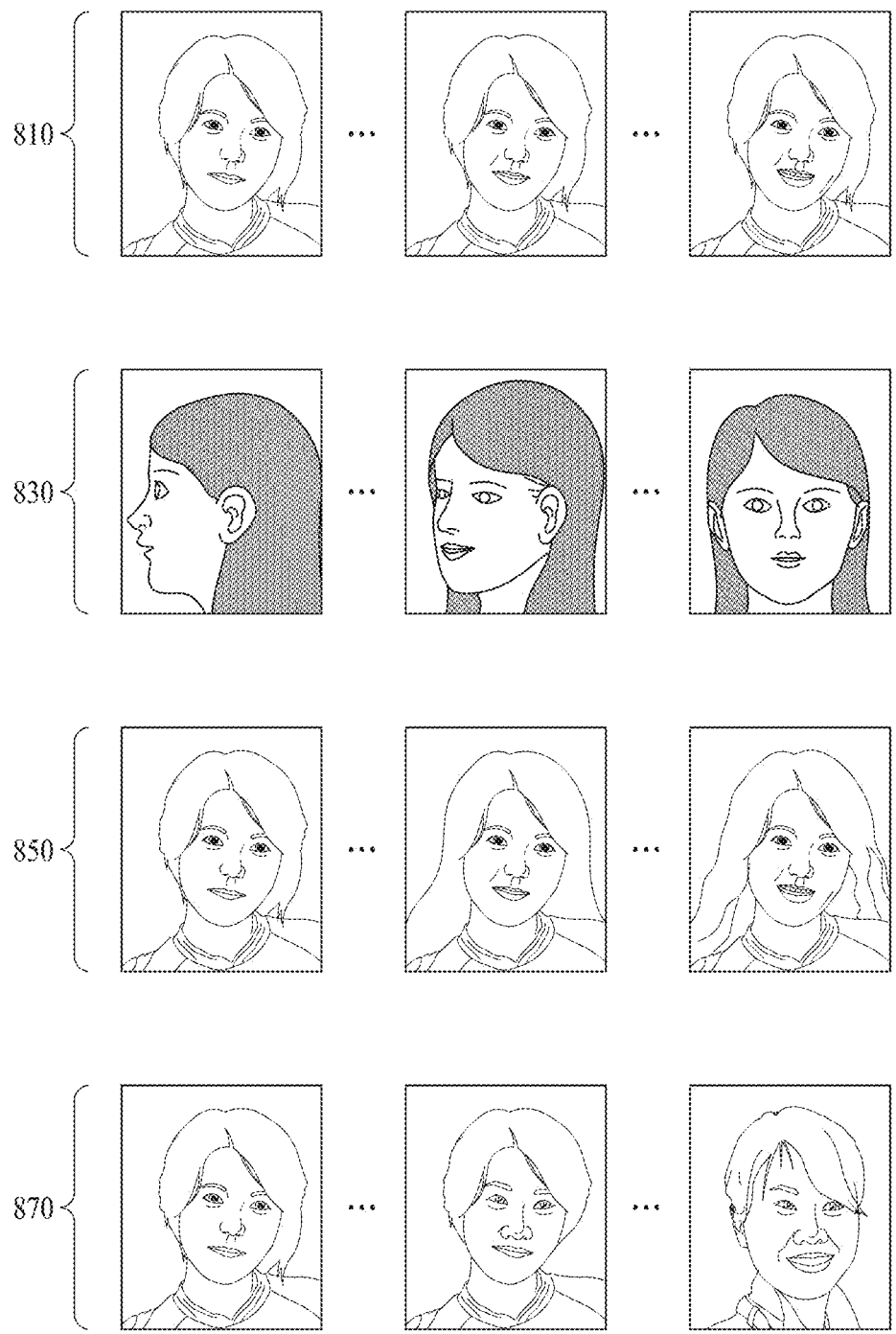
FIG. 8 illustrates examples of images transformed from an input image.

FIG. 8 illustrates examples of images transformed from an input image. More specifically, FIG. 8 illustrates images transformed from an input image by changing a target coefficient corresponding to a target semantic element, for example.

A top row 810 shows a process in which an input image representing an expressionless face is gradually transformed to images representing bright smiling expressions exposing teeth by changing (for example, increasing by "2") a target coefficient corresponding to a facial expression of the input image, when a target semantic element among semantic elements of the input image is a facial expression.

A second row 830 shows a process in which an input image representing a pose looking to the right side is gradually transformed to images representing frontal poses by changing (for example, reducing by "3") a target coefficient corresponding to a pose of the input image, when a target semantic element among semantic elements of the input image is a pose.

A third row 850 shows a process in which an input image representing a woman with a short hairstyle and an expressionless face is gradually transformed to images representing long hairstyles and smiling expressions, by changing target coefficients corresponding to a hairstyle and a facial expression of the input image, when target semantic elements among semantic elements of the input image are a hairstyle and a facial expression.

A fourth row 870 shows a process in which an input image representing a female is gradually transformed to images representing males, by changing a target coefficient corresponding to gender of the input image, when a target semantic element among semantic elements of the input image is gender.

A generation apparatus may generate various transformed images by applying a target coefficient that is to be changed, to basis vectors in an embedding space of a neural network. A direction in which a predetermined semantic element changes in the transformed images may be analyzed by sampling a basis vector.

Referring to FIG. 8, when an input vector is changed in a direction of each of basis vectors and when an image is generated using a generator, a change in a predetermined semantic element in the image may be analyzed.

Figure 9:
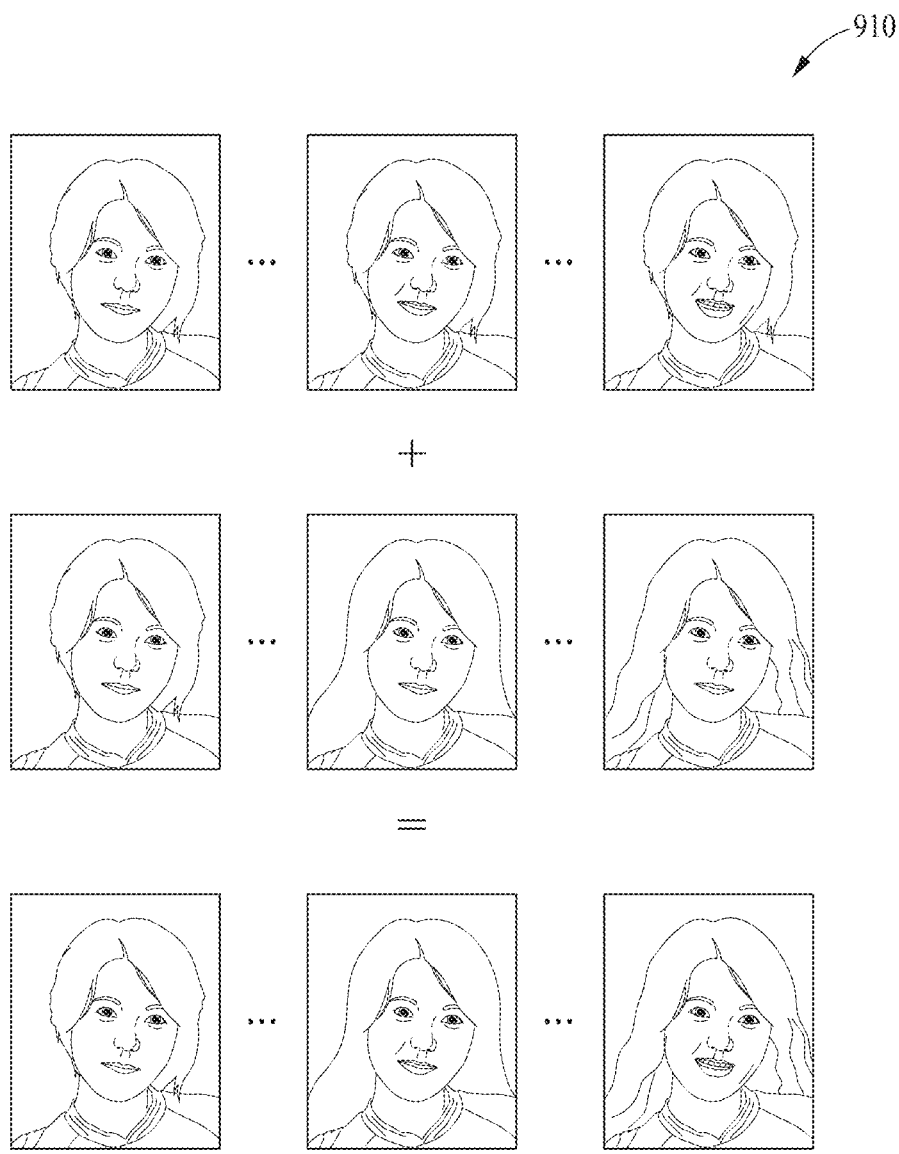
FIG. 9 illustrates examples of images transformed from an input image.

FIG. 9 illustrates examples of images transformed from an input image. More specifically, FIG. 9 illustrates images transformed from an input image by a combination of target semantic elements, for example.

A generation apparatus may manipulate a direction and/or a degree of a change in semantic elements between images using the above-described basis vectors. For example, the generation apparatus may obtain transformed images that represent both hairstyles and smiling expressions by combining and simultaneously changing a direction in which a smiling expression of a predetermined person changes and a direction in which a hairstyle changes, as indicated by reference numeral 910.

Figure 10:
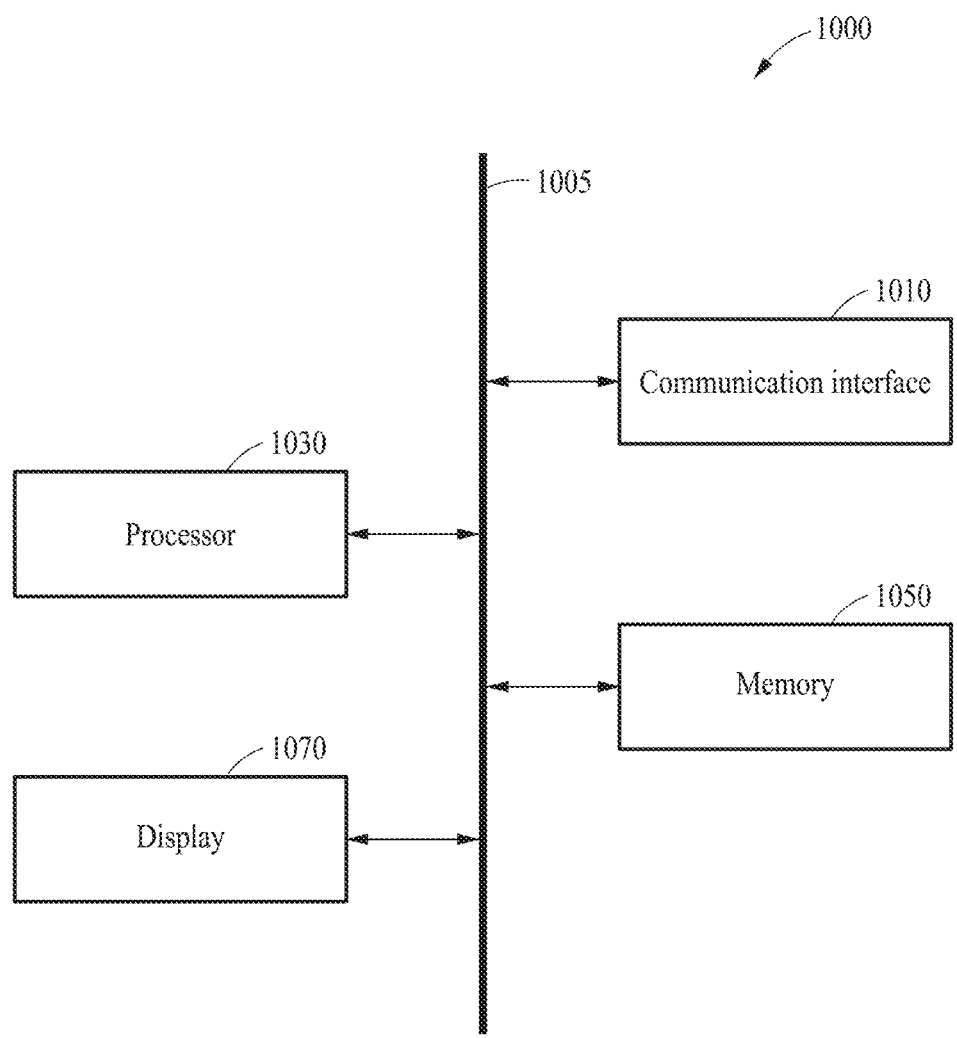
FIG. 10 illustrates an example of an apparatus for generating a transformed image.

FIG. 10 illustrates an example of a generation apparatus 1000. The generation apparatus 1000 may include a communication interface 1010, a processor 1030, a memory 1050, and a display 1070, for example. The communication interface 1010, the processor 1030, the memory 1050, and the display 1070 may be connected to each other via a communication bus 1005.

The communication interface 1010 may receive at least one input image.

The processor 1030 may extract coefficients respectively corresponding to semantic elements of the at least one input image received by the communication interface 1010 from the input image. The processor 1030 may select at least one first target coefficient corresponding to at least one target semantic element that is to be changed among the semantic elements. The processor 1030 may change the first target coefficient. The processor 1030 may generate a transformed image from the at least one input image by applying the coefficients including the changed first target coefficient to basis vectors used to represent the semantic elements in an embedding space of a neural network. The basis vectors may correspond to the semantic elements.

Also, the processor 1030 may perform one or more of the methods described with reference to FIGS. 1 through 9, or an algorithm corresponding to one or more of the methods. The processor 1030 may be a hardware-implemented generation apparatus having a circuit that is physically structured to execute desired operations. For example, the desired operations may be embodied in code or instructions included in a program. The hardware-implemented generation apparatus may include, for example, any one or any combination of a microprocessor, a central processing unit (CPU), a graphics processing unit (GPU), a processor core, a multi-core processor, a multiprocessor, an application-specific integrated circuit (ASIC), a field-programmable gate array (FPGA), and a neural processing unit (NPU).

The processor 1030 may execute a program and may control the generation apparatus 1000. Codes of the program executed by the processor 1030 may be stored in the memory 1050.

The memory 1050 may store the input image received by the communication interface 1010. The memory 1050 may store the coefficients respectively corresponding to the semantic elements of the input image extracted from the input image. Also, the memory 1050 may store a result of changing, to a target coefficient, at least one target coefficient corresponding to the target semantic element determined by the processor 1030 and/or a coefficient corresponding to a target semantic element among coefficients of the basis vectors. The memory 1050 may store the transformed image generated by the processor 1030.

The memory 1050 may store a variety of information generated in a processing process of the above-described processor 1030. Also, the memory 1050 may store a variety of data and programs. The memory 1050 may include, for example, a volatile memory or a non-volatile memory. The memory 1050 may, for example, include a high-capacity storage medium such as a hard disk to store a variety of data.

According to examples, the generation apparatus 1000 may display the transformed image generated by the processor 1030 using the display 1070.

In an example, the generation apparatus 1000 may be an image editing apparatus configured to edit or transform various semantic elements of a user face included in an input image by changing target coefficients corresponding to target semantic elements, for example, age, gender, a facial expression, or a style, of the user face.

In another example, the generation apparatus 1000 may be an authentication apparatus configured to receive an authentication image for user authentication and to determine whether to authenticate a user by comparing the authentication image and an enrollment image that is transformed by the generation apparatus 1000.

The generation apparatus 1000 may correspond to apparatuses in various fields, for example, an advanced driver-assistance system (ADAS), a head-up display (HUD), a three-dimensional (3D) digital information display (DID), a navigation device, a neuromorphic device, a 3D mobile device, a smartphone, a smart television (TV), a smart vehicle, an Internet of things (IoT) device, a medical device, and a measuring device. The 3D mobile device may correspond to, for example, a display device configured to display augmented reality (AR), virtual reality (VR), and/or mixed reality (MR).

The image generation neural network 203, the image discrimination neural network 207, the image discrimination neural network D 210, the image generation neural network 230, the image discrimination neural network 250, the encoder Eø 410, the generator Gw 450, the generator 540, the encoder 550, the encoder E 710, the generator G 750, the discriminator D 760, the residual predictor R 770, the communication bus 1005, the communication interface 1010, the processor 1030, the memory 1050, the display 1070, the neural networks, the processors, and the memories in FIGS. 1 to 10 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1 to 11 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method with generation of a transformed image, the method comprising:
   receiving an input image;
   extracting, from the input image, coefficients corresponding to semantic elements of the input image;
   selecting at least one first target coefficient, among the coefficients, corresponding to at least one target semantic element that is to be changed among the semantic elements of the input image;
   changing the at least one first target coefficient, including adjusting a first weight of the at least one first target coefficient and a second weight of at least one second target coefficient and determining the at least one first target coefficient based on the at least one first target coefficient reflecting the adjusted first weight and the at least one second target coefficient reflecting the adjusted second weight; and
   generating a transformed image from the input image by applying the coefficients, including the changed at least one first target coefficient, to basis vectors used to represent the semantic elements of the input image in an embedding space of a neural network, the basis vectors corresponding to the semantic elements of the input image.

2. The method of claim 1, wherein the neural network comprises:
   the basis vectors;
   an encoder configured to estimate coefficients of the basis vectors to map the input image to the embedding space through the basis vectors; and
   a generator configured to generate the transformed image by reflecting the coefficients corresponding to the semantic elements of the input image to the basis vectors.

3. The method of claim 2, wherein an input space of the generator, and an output space to which a vector mapped using the encoder is projected from the input image based on the basis vectors are shared as the embedding space.

4. The method of claim 1, wherein the selecting of the at least one first target coefficient comprises selecting the at least one first target coefficient using a matching table between the semantic elements and the coefficients.

5. The method of claim 1, wherein the changing of the at least one first target coefficient comprises:
   determining either one or both of a direction of a change in the at least one first target coefficient and a degree of the change in the at least one first target coefficient; and
   changing the at least one first target coefficient based on either one or both of the direction of the change and the degree of the change.

6. The method of claim 1, wherein the semantic elements comprise any one or any combination of any two or more of:
   first elements including a gender, an age, a race, a pose, a facial expression, and a size of an object included in the input image;
   second elements including a color, a shape, a style, a pose, a size, and a position of each component of the object; and
   third elements including glasses, a hat, accessories, and clothes added to the object.

7. The method of claim 1, further comprising:
   receiving a second input image for changing the at least one first target coefficient; and
   selecting, from the second input image, the at least one second target coefficient corresponding to at least one target semantic element among semantic elements of the second input image,
   wherein the changing of the at least one first target coefficient comprises determining the at least one first target coefficient based on the at least one second target coefficient.

8. The method of claim 7, wherein the determining of the at least one first target coefficient based on the at least one second target coefficient comprises either one or both of:
   determining the at least one first target coefficient by combining the at least one first target coefficient and the at least one second target coefficient; and
   determining the at least one first target coefficient by swapping the at least one first target coefficient with the at least one second target coefficient.

9. The method of claim 1, wherein the changing of the at least one first target coefficient comprises:

determining either one or both of a direction of a change in the at least one first target coefficient and a degree of the change in the at least one first target coefficient; and determining the at least one first target coefficient by combining the at least one first target coefficient reflecting the adjusted first weight and the at least one second target coefficient reflecting the adjusted second weight.

10. A method with generation of a transformed image, the method comprising:

receiving an input image;

extracting, from the input image, coefficients corresponding to semantic elements of the input image;

selecting at least one first target coefficient, among the coefficients, corresponding to at least one target semantic element that is to be changed among the semantic elements of the input image;

changing the at least one first target coefficient; and generating a transformed image from the input image by applying the coefficients, including the changed at least one first target coefficient, to basis vectors used to represent the semantic elements of the input image in an embedding space of a neural network, the basis vectors corresponding to the semantic elements of the input image, wherein the changing includes determining the at least one first target coefficient based on at least one second target coefficient, further comprising:

selecting, from a second input image, the at least one second target coefficient corresponding to at least one target semantic element among semantic elements of the second input image;

determining either one or both of a direction of a change in the at least one first target coefficient and a degree of the change in the at least one first target coefficient;

adjusting a first weight of the at least one first target coefficient and a second weight of the at least one second target coefficient based on either one or both of the direction of the change and the degree of the change; and determining the at least one first target coefficient by combining the at least one first target coefficient reflecting the adjusted first weight and the at least one second target coefficient reflecting the adjusted second weight.

11. A non-transitory computer-readable storage medium storing instructions that, when executed by a processor, cause the processor to perform the method of claim 1.

12. An apparatus with generation of a transformed image, the apparatus comprising:

a communication interface configured to receive an input image; and a processor configured to:

extract, from the input image, coefficients corresponding to semantic elements of the input image;

select at least one first target coefficient, among the coefficients, corresponding to at least one target semantic element that is to be changed among the semantic elements of the input image;

change the at least one first target coefficient, including adjusting a first weight of the at least one first target coefficient and a second weight of at least one second target coefficient and determining the at least one first target coefficient based on the at least one first target coefficient reflecting the adjusted first weight and the at least one second target coefficient reflecting the adjusted second weight; and generate a transformed image from the input image by applying the coefficients, including the changed at least one first target coefficient, to basis vectors used to represent the semantic elements of the input image in an embedding space of a neural network, the basis vectors corresponding to the semantic elements of the input image.

13. The apparatus of claim 12, wherein the neural network comprises:

the basis vectors;

an encoder configured to estimate coefficients of the basis vectors to map the input image to the embedding space through the basis vectors; and a generator configured to generate the transformed image by reflecting the coefficients corresponding to the semantic elements of the input image to the basis vectors.

14. The apparatus of claim 13, wherein an input space of the generator, and an output space to which a vector mapped using the encoder is projected from the input image based on the basis vectors are shared as the embedding space.

15. The apparatus of claim 12, wherein the processor is further configured to select the at least one first target coefficient using a matching table between the semantic elements and the coefficients.

16. The apparatus of claim 12, wherein the processor is further configured to:

determine either one or both of a direction of a change in the at least one first target coefficient and a degree of the change in the at least one first target coefficient; and change the at least one first target coefficient based on either one or both of the direction of the change and the degree of the change.

17. The apparatus of claim 12, wherein the semantic elements comprise any one or any combination of any two or more of:

first elements including a gender, an age, a race, a pose, a facial expression, and a size of an object included in the input image;

second elements including a color, a shape, a style, a pose, a size, and a position of each component of the object; and third elements including glasses, a hat, accessories, and clothes added to the object.

18. The apparatus of claim 12, wherein the communication interface is further configured to receive a second input image for changing the at least one first target coefficient, and wherein the processor is further configured to:

select, from the second input image, the at least one second target coefficient corresponding to at least one target semantic element among semantic elements of the second input image; and determine the at least one first target coefficient based on the at least one second target coefficient.

19. The apparatus of claim 18, wherein the processor is further configured to determine the at least one first target coefficient by combining the at least one first target coefficient and the at least one second target coefficient, or by swapping the at least one first target coefficient with the at least one second target coefficient.

20. The apparatus of claim 18, wherein the processor is further configured to:

determine either one or both of a direction of a change in the at least one first target coefficient and a degree of the change in the at least one first target coefficient; and determine the at least one first target coefficient by combining the at least one first target coefficient reflecting the adjusted first weight and the at least one second target coefficient reflecting the adjusted second weight.

21. The apparatus of claim 12, further comprising:
a display configured to display the transformed image.

22. The apparatus of claim 12, wherein the input image comprises an enrollment image for user authentication, and
wherein the apparatus is configured to perform the user authentication by comparing an authentication image of a user to the transformed image.

23. An apparatus with image transformation, comprising:
at least one processor configured to implement a neural network, the neural network comprising:
an embedding space;
basis vectors representing semantic elements of an input image inputted to the apparatus;
an encoder configured to estimate coefficients of the basis vectors to map the input image to the embedding space through the basis vectors; and
a generator configured to generate a transformed image by:
changing at least one first target coefficient, among the coefficients, corresponding to at least one target semantic element that is to be changed among the semantic elements of the input image, including adjusting a first weight of the at least one first target coefficient and a second weight of at least one second target coefficient and determining the at least one first target coefficient based on the at least one first target coefficient reflecting the adjusted first weight and the at least one second target coefficient reflecting the adjusted second weight; and
applying the coefficients, including the changed at least one first target coefficient, to the basis vectors.

24. The apparatus of claim 23, wherein the embedding space is configured as an input space of the generator and an output space of the encoder.

25. The apparatus of claim 23, wherein the semantic elements comprise facial and hair appearance attributes of a person.

26. The apparatus of claim 23, wherein the generator is further configured to:
select, from a second input image, the at least one second target coefficient corresponding to at least one target semantic element among semantic elements of the second input image; and
determine the at least one first target semantic element by performing either one of:
combining the at least one first target coefficient and the at least one second target coefficient; and
swapping the at least one first target coefficient with the at least one second target coefficient.

* * * * *